United States Patent

[11] 3,625,859

[72] Inventors Sei Hashimoto;
Kunihiko Hirose, both of Kyoto, Japan
[21] Appl. No. 846,612
[22] Filed July 31, 1969
[45] Patented Dec. 7, 1971
[73] Assignee San-Abbott Limited
Kyoto, Japan
[32] Priorities Aug. 6, 1968
[33] Japan
[31] 43/55740;
Oct. 26, 1968, Japan, No. 43/78030; Dec. 14, 1968, Japan, No. 43/91711

[54] CORROSION INHIBITING COMPOSITION
8 Claims, No Drawings
[52] U.S. Cl.......................................... 252/392,
21/2.5, 21/2.7, 208/47, 252/148, 252/392,
252/8.55 E, 260/239 BC, 260/251 R, 260/309.6
[51] Int. Cl.......................................... C23f 11/10,
C23f 11/14
[50] Field of Search............................................. 252/390,
8.55 E, 148, 392; 21/2.7, 2.5; 208/47; 260/309.6,
251 R, 239 BC

[56] References Cited
UNITED STATES PATENTS
2,468,163 4/1949 Blair et al. .................... 252/8.55 E
OTHER REFERENCES
Condensed Chemical Dictionary, 1961, Reinhold, p. 38

Primary Examiner—Richard D. Lovering
Assistant Examiner—Irwin Gluck
Attorney—Robert L. Niblack ABSTRACT: Fatty acid addition salts of amines of the formula

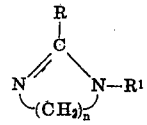

wherein R and R' are inert radicals and together may form a methylene chain and $n$ is 2, 3, 4 or 5, and compositions containing such salts and specific extenders have been found to be effective corrosion inhibitors for aqueous and oil systems.

CORROSION INHIBITING COMPOSITION

Corrosion inhibitors are becoming more and more important in the modern technology for the preservation of the more sophisticated equipment used in today's industry. The equipment has to be protected against the influences of corroding gases, liquids or solids with which it comes in contact. A really desirable inhibitor that would find general acceptance has so far not been found. One of the disadvantages of today's corrosion inhibitors is the limited solubility they have: they are usually soluble in oil or in water, but not in both and may therefore be applied only from either an aqueous or an oil system.

Oil soluble corrosion inhibitors used today are generally known to be not very efficient under severe conditions; on the other hand, the known water-soluble corrosion inhibitors are generally inferior to oil-soluble inhibitors.

Acid addition salts of carboxylic acids and certain amines have been used in the past as corrosion inhibitors. These salts are usually either water-soluble or oil-soluble but not soluble in both systems.

It is, therefore, an object of the present invention to provide a corrosion inhibitor which is soluble in aqueous and oil systems; it is another object of this invention to provide a corrosion inhibitor which is effective under severe conditions of humidity and temperature; it is a further object of this invention to provide corrosion inhibiting compositions which can be applied through aqueous or oil systems and which are effective under severe conditions.

These and other objects are accomplished by providing a composition containing 10–100 percent by weight of a higher aliphatic mono- or polycarboxylic acid addition salt of an amine of the formula

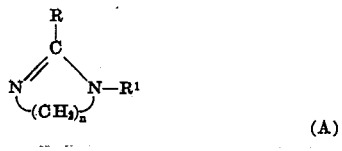

(A)

hereinafter referred to as "aliphatic amine salt" wherein R is hydrogen or an alkyl group of one to eight carbon atoms, R' is an aliphatic group of one to eight carbon atoms, or R and R' together form a methylene chain of 2–11 carbon atoms, $n$ is an integer from 2 to 5, and 90–9 percent by weight of an extender selected from (a) a liquid or solid organic amine of the formula $H_2NR''$, $HNR''_2$, $NR''_3$, $R''NHR'''NH_2$ or morpholine, with each R'' representing an alkyl group of 1–18 carbon atoms, a hydroxy alkyl of two to three carbon atoms or cyclohexyl, and R''' is an alkylene chain of two to six carbon atoms, (b) a higher aliphatic acid addition salt of an organic amine defined as in (a), (c) a polyhydric alcohol partially esterified with a fatty acid, (d) a salt between the amine of formula (A) and an aromatic or hydroxy substituted aromatic carboxylic acid, or any combination of these extenders. The above "aliphatic amine salts" can be used alone, but best results are obtained when the ratio between said salt and an extender is at least 98:2 percent by weight, preferably between 8:2 and 2:8, with optimum results being obtained when the ratio is between 7:3 and 3:7. However, even when containing as little as 10 percent by weight of the "aliphatic amine salt," the combination product provides excellent corrosion inhibition and such compositions can be applied through aqueous or non-aqueous systems.

The "aliphatic amine salts" are those produced from carboxylic acids having at least eight, preferably between 11 and 44, carbon atoms; the acids may be mono-carboxylic or polycarboxylic acids and they may be saturated or unsaturated, and the carbon chain may be branched or linear. Particular examples are the saturated mono-carboxylic acids such as pelargonic acid, capric acid, undecylic acid, lauric acid, tridecylic acid, myristic acid, pentadecylic acid, palmitic acid, heptadecyclic acid, stearic acid, nonadecaic acid, arachidic acid and the like; unsaturated mono-carboxylic acids such as undecilenic acid, oleic acid, elaidic acid, cetoleic acid and the like; saturated polycarboxylic acids such as adipic acid, suberic acid, azelaic acid, sebacic acid and the like; and poly-unsaturated carboxylic acids such as linolenic acid, parinaric acid, arachidonic acid and the like; and fatty acids derived from natural fat and oil, for example, fatty acids of linseed oil, olive oil, cacao butter, seasame oil, ricebran oil, soybean oil, rape oil, palm oil, castor oil, cotton seed oil, coconut oil, peanut oil, tallow, wool fat and sardine oil; and hydrogenated fatty acids of sardine oil and herring oil, fatty acid or sperm oil and finback oil; polymerized unsaturated acids, e.g., dimer acid or the polymers obtained from maleic acid/oleic acid, maleic acid/castor oil, maleic acid/dimer acid, rosin-oleic acid/maleic acid, and the like. Among these, monocarboxylic acids of 11– carbon atoms and tricarboxylic acid of 35–44 carbon atoms are preferred.

Among the amines represented by the above formula (A) are the imidazolines which may be substituted by loweralkyl groups, e.g., 1,2-dimethylimidazoline and 1-methyl-2-octylimidazoline; the tetrahydropyrimidines, e.g., 1-methyl-1,4,5,6-tetrahydropyrimidine, 1-methyl-2-octyl-1,4,5,6-tetrahydropyrimidine, 1,2,4-trimethyl-1,4,5,6-tetrahydropyrimidine; or bicyclic compounds e.g., 1,5-diazabicyclo(4,2,0)octene-5, 1,8-diazabicyclo(7,2,0)undecene-8, 1,4-diaza-bicyclo(3,3,0)octene-octent-4, 1,8-diazabicyclo(5,4,0)undecene-7, 1,8-diaza-bicyclo(7,4,0)-tridecene-8, 1,8-diaza-bicyclo(5,3,0)decene-7, 1,14-diazabicyclo(11,4,0)heptadecene-13, etc. In the preferred compound of formula (A), $n$, is 3 or 4 and R and R' form a methylene chain of three to five carbon atoms.

In order to prepare the salts from the above-described carboxylic acids and the above amines, the two components are mixed and stirred for 2–3 hours at 0°–100° C. The acid and amine may be used in equimolar amounts, or an excess amount of up to 50 percent of either component may be employed. A solvent such as an alcohol (methanol, butanol, etc.) or a hydrocarbon (pentene, benzene, toluene, etc. or another inert liquid may be used. The salt or solution may be used in the present invention without removal of excess amine, acid or solvent.

As indicated above, various extenders can be used in conjunction with the above-defined "aliphatic amine salt." One of these is an aliphatic or alicyclic amine of the type defined as (a) above. Specific representatives are methylamine, diethylamine, dimethylpropylamine, laurylamine, stearylamine, oleylamine, methyllaurylamine, ethylstearylamine, methyloleylamine; mono-, di-, or triethanolamines, methyldiethanolamine; alkylenediamines with two to six carbon atoms, cyclohexylamine, dicyclohexylamine, N-alkyl and N-(hydroxyalkyl)-cyclohexylamines or -dicyclohexyl-amines with one to four carbon atoms per alkyl chain.

Another of the above-mentioned extenders is a higher aliphatic carboxylic acid addition salt of the amino compounds just mentioned. The acids with which these addition salts are formed are the same as those mentioned above for forming the acid addition salts referred to as "aliphatic amine salts."

Another component useful as an extender is a partially esterified polyhydric alcohol preferably containing 2–4 hydroxy wherein the ester group is that derived from an aliphatic mono-carboxylic acid of preferably e.g., 18 carbon atoms, e.g., a mono-glyceride of lauric acid, oleic acid, stearic acid, or a diglyceride of this type; an aliphatic acid ester of a divalent alcohol, e.g., the mono-ester between dihydroxybutane and lauric acid, an aliphatic acid ester of a tetravalent alcohol, e.g., sorbitan mono- or di-oleate, and the like.

The last type of extender for the above "aliphatic amine salt" is the salt formed between the amine defined by the above structural formula (A) and an aromatic carboxylic acid (preferably a monocyclic monocarboxylic acid), e.g., benzoic acid, phenylacetic acid, cinnamic acid, phthalic acid, isophthalic acid, terephthalic acid, hemimellic acid, trimellic acid, trimesinic acid or a hydroxy-substituted aromatic carboxylic acid such as salicyclic acid, o-hydroxycumaric acid, o-hydroxycinnamic acid, protocatechuic acid, vanillenic acid, resorcylic acid as well as amino-substituted carboxylic acids such as aminobenzoic acids and the like.

The new composite mixtures are prepared simply by blending the "aliphatic amine salt" of formula (A) with desired extender (a), (b), (c) or (d) or a mixture thereof at a temperature between 0° and 100° C. in the presence or absence of an inert solvent. Again, when a solvent is used, its removal before use of the composition is optional.

The corrosion inhibitors of the present invention are used in a simple and conventional manner, i.e., in the same fashion as the process for applying previously known corrosion inhibitors: the new compound is added to water or oil to form a solution or suspension which is sprayed or otherwise applied to the surface which is to be protected from corrosion. The amount of the composition of the present invention used as inhibitors is between 0.01 and 10.0 percent, preferably between 0.1 and 5 percent by weight based on the weight of the water or oil medium. The corrosion inhibitors of the present invention are applicable to iron, steel, nonferrous metals and alloys where they exhibit outstanding corrosion preventive properties.

As outlined above, the "aliphatic amine salts" of this invention are used as corrosion inhibitors in combination with one, two, three or four of the extenders described and defined above. The combination with two of the above extenders is preferred, and best results are obtained by using a combination of the "aliphatic amine salt" with extenders (a) and (c) or (a) and (d) of the above classes.

Where the "aliphatic amine salts" are mixed with one or more extenders, a wide range of proportions between the components is acceptable and produces good corrosion inhibition. For instance, if the above "aliphatic amine salt" is combined with dihydroxyethylcyclohexylamine and sorbitan monooleate, the ratio between the two extenders may vary between 100:1 and 1:100, preferably between 100:10 and 10:100 parts by weight. In any case, the composition so formed can be used in a concentration of between 0.01 and 10.0 percent by weight in water or oil to produce corrosion inhibition.

In order to illustrate the usefulness of the present compositions, reference is made to the following examples which, of course, are not meant to limit the invention in any respect. In these examples, all proportions and percentages are based on weight.

EXAMPLE 1

Wrought iron test pieces of 60×80×1 mm. are pretreated as follows: they are sanded with Emery's garnet paper No. 240, washed with alcohol and ether, dried by hot air and cooled to room temperature. The test pieces are then immersed into a corrosion inhibiting solution of the composition indicated below for a period of 1–2 minutes at room temperature, followed by air drying. The pieces are then suspended in a "humidity cabinet" where they are exposed to air containing 98 ±1 percent humidity at 49° ±1° C. The air is circulated through the humidity cabinet at a rate of three times the volume of the cabinet capacity per hour.

In this example, the test pieces were immersed for about 1.5 minutes in turbine oil containing 1 percent by weight of the indicated "aliphatic amine salt" or in water containing 2 percent by weight of the "aliphatic amine salt." The following table lists the results obtained with the two systems, indicating the percentage of the surface of the test sample which shows signs of corrosion after the number of hours indicated in parenthesis after each figure. The percentage is arrived at by dividing the surface of the iron plate into 100 equal squares and counting the squares which are affected by this severe treatment. As a comparison, an identical sample was pretreated and treated in identical fashion except for the step of immersing it into a corrosion inhibiting system. In this control test, corrosion occurrence was 100 percent after 30 minutes.

The "aliphatic amine salts" listed below are those made from equimolar amounts of the amine and the aliphatic carboxylic acid.

TABLE I

| Test No. | Inhibitor | 1% concentration in oils; percent corrosion (hrs.) | 2% in water; percent corrosion (hrs.) |
| --- | --- | --- | --- |
| 1 | Salt of 1,8-diaza-bicyclo(5,4,0)undecene-7 and lauric acid. | 21 (4) | 85 (2.5) |
| 2 | Salt of 1,8-diaza-bicyclo(5,4,0)undecene-7 and stearic acid. | 61 (4) | 88 (2.5) |
| 3 | Salt of 1,8-diaza-bicyclo(5,4,0)undecene-7 and oleic acid. | 10 (68) | 11 (2.5) |
| 4 | Salt of 1,5-diaza-bicyclo(4,3,0)nonene-5 and lauric acid. | 20 (4.5) | 90 (2.5) |
| 5 | Salt of 1,5-diaza-bicyclo(4,3,0)nonene-5 and stearic acid. | 60 (4) | 90 (2.0) |
| 6 | Salt of 1,5-diaza-bicyclo(4,3,0)nonene-5 and oleic acid. | 10 (70) | 13 (2.5) |
| 7 | Salt of 1-methyl-2-propyl-1,4,5,6-tetrahydropyrimidine and lauric acid. | 20 (4) | 90 (2.0) |
| 8 | Salt of 1-methyl-2-propyl-1,4,5,6-tetrahydropyrimidine and stearic acid. | 63 (4) | 90 (2.0) |
| 9 | Salt of 1-methyl-2-propyl-1,4,5,6-tetrahydropyrimidine and oleic acid. | 10 (65) | 91 (2.0) |
| 10 | Salt of 1-methyl-2-octyl-1,4,5,6-tetrahydropyrimidine and lauric acid. | 20 (4) | 95 (2.0) |
| 11 | Salt of 1-methyl-2-octyl-1,4,5,6-tetrahydropyrimidine and oleic acid. | 10 (60) | 85 (2.5) |
| 12 | Salt of 1,8-diaza-bicyclo(5,4,0)undecene-7 and dimer acid. | 11 (240) | 87 (2.5) |
| 13 | Salt of 1,5-diaza-bicyclo(4,3,0)nonene-5 and dimer acid. | a 10 (210) | 83 (2.5) |
| 14 | Salt of 1-methyl-2-propyl-1,4,5,6-tetrahydropyrimidine and dimer acid. | a 10 (230) | 80 (2.0) |
| 15 | Salt of 1,8-diaza-bicyclo(5,4,0)undecene-7 and maleic acid/oleic acid 1:1.c | 6 (400) | 90 (2.5) |
| 16 | Salt of 1,5-diaza-bicyclo(4,3,0)nonene-5 and maleic acid/oleic acid 1:1.c | 7 (300) | 88 (2.5) |
| 17 | Salt of 1-methyl-2-propyl-1,4,5,6-tetrahydropyrimidine and maleic acid/oleic acid 1:1.c | 6 (380) | 81 (2.5) |
| 18 | Salt of 1-methyl-2-octyl-1,4,5,6-tetrahydropyrimidine and maleic acid/oleic acid 1:1.c | 5 (300) | 94 (2.5) |
| 19 | Salt of 1,8-diaza-bicyclo(5,4,0)undecene-7 and maleic acid/castor oil fatty acid 1:1.c | 6 (400) | 91 (2.5) |
| 20 | Salt of 1,8-diaza-bicyclo(7,3,0)dodecene-8 and maleic acid/castor oil fatty acid 1:1.c | 6 (380) | 50 (2.5) |
| 21 | Salt of 1-methyl-2-octyl-1,4,5,6-tetrahydropyrimidine and maleic acid/castor oil fatty acid 1:1.c | 6 (350) | 70 (2.5) |
| 22 | Salt of 1,8-diaza-bicyclo(5,4,0)undecene-7 and maleic acid/whale oil fatty acid/rosin 2:1:1.c | 3 (400) | 91 (2.5) |
| 23 | Salt of 1,5-diaza-bicyclo(4,3,0)nonene-5 and maleic acid/whale oil fatty acid/rosin 2:1:1.c | 5 (400) | b 90 (2.5) |
| 24 | Salt of 1-methyl-2-octyl-1,4,5,6-tetrahydropyrimidine and maleic acid/whale oil fatty acid/rosin 2:1:1.c | 10 (400) | b 90 (2.5) | a Dynamo oil instead of turbine oil.
b 3% concentration of inhibitor.
c Mole ratio of acids.

EXAMPLE 2

In table II below are listed the results obtained by following the procedure of example 1 in identical fashion except for using a combination of an "aliphatic amine salt" together with one or more extenders listed in table II. The results are reported as explained in example 1. In all examples, the combinations listed are on an equal weight basis except where a different ratio is shown. Tests 25–42 refer to the use of one of the above possible extenders: in tests 25–31, an aliphatic or alicyclic amine (a) is used; in tests 32 and 34, the extenders are an aliphatic carboxylic acid salt of an alicyclic or aliphatic amine (b); in tests 35–38, a partially esterified polyhydric alcohol (c) and in tests 39–42, an aromatic carboxylic acid salt of the compound identified by chemical structure (d) is used as extender.

In tests 43–69, two extenders are used with the "aliphatic amine salts" described: tests 43–46 use (a) and (b), 47–55 use (a) and (c), 56–58 use (a) and (d), 59–62 use (b) and (c), 63–65 use (b) and (d) and 66–69 use (c) and (d). In tests 70–85, three extenders are used in each case, (a), (b) and (c) in the first four tests, (a), (b) and (d), (a), (c), and (d) and (b), (c) and (d), respectively, in the following groups of four tests each. The last four tests (86–89) exemplify systems containing a representative of each of the above groups of extenders.

TABLE II

| Test No. | Inhibitor | 1% in oil; percent corrosion (hrs.) | 2% in water; percent corrosion (hrs.) |
|---|---|---|---|
| 25 | Test compound 1 and N-cyclohexyl-morpholine. | 6 (47) | |
| 26 | Test compound 1 and N-ethyl-morpholine. | 10 (69) | |
| 27 | Test compound 2 and cyclohexylamine. | | 1 (10) |
| 28 | Test compound 6 and N-ethyldiethanolamine. | | 2 (20) |
| 29 | Test compound 9 and N-aminoethyloctylamine. | | b 50 (20) |
| 30 | Test compound 3 and N,N-dihydroxyethylcyclohexylamine. | | 1 (24) |
| 31 | Test compound 22 and N-ethylethanolamine. | | b 5 (10) |
| 32 | Test compound 13 and stearyl amine salt of maleic acid/oleic acid 1:1.a | 10 (250) | |
| 33 | Test compound 22 and ethylenediamine salt of whale oil fatty acid. | | b 5 (231) |
| 34 | Test compound 13 and diethylamine salt of oleic acid. | | 5 (8) |
| 35 | Test compound 6 and oleyl monoglyceride. | 6 (300) | |
| 36 | Test compound 16 and sorbitan mono-oleate. | 10 (200) | |
| 37 | Test compound 3 (7 parts) and sorbitan mono-oleate (3 parts). | | 5 (12) |
| 38 | Test compound 12 (8 parts) and sorbitan mono-oleate (2 parts). | | 10 (10) |
| 39 | Test compound 15 and phthalic acid salt of 1,2-dimethyl-1,4,5,6-tetrahydropyrimidine. | 5 (180) | |
| 40 | Test compound 22 and salicylate salt of 1,8-diaza-bicyclo(5,4,0)-undecene-7 (Ratio 7:3). | 10 (190) | |
| 41 | Test compound 3/salicylate salt of 1,8-diaza-bicyclo(5,4,0)undecene-7 8:2. | | 4 (12) |
| 42 | Test compound 12 and salicylate salt of 1,8-diaza-bicyclo(5,4,0)-undecene-7. | | 2 (8) |
| 43 | Test compound 15 (3 parts) Dihydroxyethylcyclohexylamine (3 parts). Oleate of dicyclohexylamine (4 parts). | 5 (250) | |
| 44 | Test compound 19/dicyclohexylamine/oleate of oleylamine Ratio 5:1:4. | 3 (280) | |
| 45 | Test compound 3/dihydroxyethylcyclohexylamine/octylic acid salt of ethanolamine 5:3:2. | | 1 (8) |
| 46 | Test compound 3/ethanolamine/octylic acid salt of diethylethanolamine 5:2:3. | | 3 (8) |
| 47 | Test compound 3/N,N-dihydroxyethylcyclohexylamine/sorbitan mono-oleate 2:8:1. | 22 (6) | 1 (20) |
| 48 | Test compound 3/N,N-dihydroxyethylcyclohexylamine/sorbitan mono-oleate 8:5:2. | 6 (200) | |
| 49 | Salt of 1,5-diaza-bicyclo(4,3,0)-nonene-5 and myristic acid/N,N-dihydroxyethylbutylamine/sorbitan mono-laurate 5:5:2. | 10 (210) | |
| 50 | Test compound 9/triethanolamine/sorbitan mono-oleate 3:7:1. | 11 (240) | 3 (20) |
| 51 | Test compound 15/N,N-dimethylcyclohexylamine/sorbitan di-laurate 7:3:2. | 5 (150) | 5 (10) |
| 52 | Test compound 24/N,N-dimethylpropylamine/sorbitan di-laurate 7:3:2. | 10 (180) | 3 (8) |
| 53 | Test compound 3/N,N-dihydroxyethylcyclohexylamine/ethylene glycol mono-oleate 8:2:2. | 5 (160) | 20 (20) |
| 54 | Test compound 3/N,N-dihydroxyethylcyclohexylamine/1,4-butadiol mono-oleate 5:5:2. | 3 (100) | 3 (15) |
| 55 | Test compound 3/N,N-dihydroxyethylcyclohexylamine/sorbitan mono-oleate 8:2:2. | | 1 (15) |
| 56 | Test compound 3/salt of 1,8-diaza-bicyclo(5,4,0)undecene-7 and salicylic acid/N,N-dihydroxyethylcyclohexylamine 2:2:8. | 5 (10) | 1 (20) 5 (23) |
| 57 | Test compound 9/salt of 1,5-diaza-bicyclo(4,3,0)nonene-5 and p-aminobenzoic acid/triethanolamine 4:1:16. | 2 (200) | d 3 (10) |
| 58 | Test compound 24/salt of 1-methyl-2-octyl-1,4,5,6-tetrahydropyrimidine and salicylic acid/N,N-dimethylpropylamine 8:2:2. | 3 (250) | 1 (12) 5 (18) |
| 59 | Test compound 3/salt of dicyclohexylamine and oleic acid/sorbitan mono-oleate 2:5:3. | 3 (250) | |
| 60 | Test compound 12/salt of ethylenediamine and oleic acid/sorbitan mono-oleate 4:4:2. | 5 (180) | |
| 61 | Test compound 3/salt of ethanolamine and octylic acid/sorbitan mono-oleate 5:3:2. | | d 1 (7) |
| 62 | Test compound 3/salt of diethanolamine and octylic acid/ethyleneglycol mono-oleate 8:2:1. | | d 5 (15) |
| 63 | Test compound 3/salt of dicyclohexylamine and oleic acid/salt of 1,8-diaza-bicyclo-(5,4,0)undecene-7 and salicylic acid 5:5:1. | 4 (200) | 1 (10) |
| 64 | Test compound 3/salt of oleylamine and oleic acid/salt of 1,8-diazabicyclo(5,4,0)undecene-7 and phthalic acid 3:5:3. | 5 (150) | |
| 65 | Test compound 3/salt of ethanolamine and oleic acid/salt of 1,8-diaza-bicyclo (5,4,0)undecene-7 and salicylic acid 5:2:3. | | d 3 (7) |
| 66 | Test compound 3/sorbitan monooleate/salt of 1,8-diaza-bicyclo(5,4,0)-undecene-7 and phthalic acid 3:5:2. | 2 (150) | |
| 67 | Test compound 3/sorbitan monooleate/salt of 1,8-diaza-bicyclo(5,4,0)-undecene-7 and phthalic acid 10:1:10. | | 1 (15) |
| 68 | Test compound 3/sorbitan monooleate/salt of 1,8-diaza-bicyclo(5,4,0)-undecene-7 and salicylic acid salt 5:1:5. | | d 1 (10) |
| 69 | Test compound 3/sorbitan di-oleate/salt of 1,2-dimethyl-1,4,5,6-tetrahydropyrimidine and salicylic acid 2:5:5. | 5 (200) | |
| 70 | Test compound 3/dimethylcyclohexylamine/salt of dicyclohexylamine and oleic acid/sorbitan mono-oleate 2:1:5:2. | 1 (200) | |
| 71 | Test compound 3/N,N-dihydroxyethylcyclohexylamine/salt of ethylene diamine and oleic acid/sorbitan mono-oleate 1:2:5:2. | 1 (250) | |
| 72 | Test compound 3/N,N-dihydroxyethylcyclohexylamine/salt of dicyclohexylamine and oleic acid/sorbitan mono-oleate 8:1:1:1. | | 5 (20) |
| 73 | Test compound 3/ethanolamine/salt of oleylamine and oleic acid/sorbitan mono-oleate 5:2:1:2. | | d 1 (15) |
| 74 | Test compound 3/dimethylcyclohexylamine/salt of dicyclohexylamine and oleic acid/salt of 1,8-diaza-bicyclo-(5,4,0)undecene-7 and oleic acid 2:2:5:1. | 1 (200) | |
| 75 | Test compound 3/triethanolamine/salt of ethylenediamine and oleic acid/salt of 1,8-diaza-bicyclo(5,4,0)-undecene-7 and phthalic acid 1:1:6:2. | 5 (200) | |
| 76 | Test compound 3/N,N-dihydroxyethylcyclohexylamine/salt of ethylenediamine and oleic acid/salt of 1,8-ethylcyclohexylamine/salt of ethylene-diamine and oleic acid/salt of 1,8-diaza-bicyclo(5,4,0)undecene-7 and salicylic acid 5:2:1:2. | | d 1 (10) |
| 77 | Test compound 3/diethanolamine/salt of octylamine and oleic acid/salt of 1,8-diaza-bicyclo(5,4,0)unde-cene-7 and salicylic acid 10:2:1:8. | | d 1 (15) |
| 78 | Test compound 3/dimethylcyclohexylamine/sorbitan mono-oleate/salt of 1,8-diaza-bicyclo(5,4,0)unde-cene-7 and salicylic acid 3:3:3:3. | 1 (200) | |
| 79 | Test compound 22/dimethylcyclohexylamine/sorbitan mono-oleate/salt of 1,8-diaza-bicyclo(5,4,0)-undecene-7 and phthalic acid 2:2:3:3. | 4 (250) | |
| 80 | Test compound 3/N,N-dihydroxy ethylcyclohexylamine/sorbitan mono-oleate/salt of 1,8-diazabicyclo(5,4,0)undecene-7 and salicylic acid 5:5:1:1. | | d 1 (15) |
| 81 | Test compound 12/diethanolamine/sorbitan mono-oleate/salt of 1,8-diaza-bicyclo(5,4,0)undecene-7 and phthalic acid 4:3:2:2. | | d 2 (15) |
| 82 | Test compound 3/salt of dicyclohexylamine and oleic acid/sorbitan mono-oleate/salt of 1,8-diazabicyclo(5,4,0)undecene-7 and p-aminobenzoic acid 1:4:1:2. | 1 (200) | |
| 83 | Test compound 3/salt of N-methylcyclohexylamine and maleic acid: whale oil fatty acid:rosin (2:1:1)/sorbitan mono-oleate/salt of 1,8-diaza-bicyclo(5,4,0)undecene-7 and salicylic acid 1:4:4:1. | 5 (150) | |
| 84 | Test compound 3/salt of ethylenediamine and oleic acid/sorbitan mono-oleate/salt of 1,8-diaza-bicyclo(5,4,0)undecene-7 and salicylic acid 7;1;1;2. | | d 3 (20) |
| 85 | Test compound 3/salt of ethanolamine and oleic acid/sorbitan mono-oleate/salt of 1,8-diaza-bicyclo(5,4,0)undecene-7 and salicylic acid 5:1:1:5. | | d 1 (10) |
| 86 | Test compound 3/dimethylcyclohexylamine/salt of dicyclohexyl amine and oleic acid/sorbitan mono-oleate/salt of 1,8-diaza-bicyclo(5,4,0)undecene-7 and salicylic acid 1:2:5:1:1. | 4 (100) | |

| | | | | |
|---|---|---|---|---|
| 87 | Test compound 15/tributylamine/sorbitan mono-oleate/salt of 1,8-bicyclo(5,4,0)undecene-7 and salicylic acid/salt of dicyclohexylamine and oleic acid 1:2:1:1:6. | | 3 (150) | |
| 88 | Test compound 3/N,N-dihydroxyethylcyclohexylamine/sorbitan mono-oleate/salt of 1,8-diaza-bicyclo(5,4,0)undecene-7 and salicylic acid/salt of cyclohexylamine and oleic acid 6:1:1:1:1. | | | d 1 (15) |
| 89 | Test compound 3/diethanolamine/sorbitan mono-oleate/salt of 1,8-diaza-bicyclo(5,4,0)undecene-7 and salicylic acid/salt of diethanolamine and oleic acid 3:3:1:2:1. | | | d 1 (20) | a Mole ratio of acids.
b 3% concentration of inhibitor.
c 2% concentration of inhibitor.
d 1% concentration of inhibitor.

EXAMPLE 3

The compounds and compositions of the present invention can be used as additives to corrosive liquids as illustrated in the following tests: a corrosion inhibitory composition of the type described above is dissolved to a concentration of 0.1 percent in water and, for separate tests in a 3-5 percent by weight of aqueous sodium chloride solution. A test panel made from copper or steel having a total surface area of 12 cm.² is suspended into such a solution at room temperature for 30 days. The weight loss of the metal piece is subsequently determined and the corrosion stability is calculated from the equation Stability (%) = weight of control—weight loss during treatment/weight of control)

The following table shows the stabilities determined in this fashion in %.

| Test No. | Composition used, test compound No. | Steel Water | Steel NaCl (percent) | Copper Water | Copper NaCl (percent) |
|---|---|---|---|---|---|
| 90 | 56 | 91.5 | 90.3 (3%) | 78.8 | 70.0 (3%) |
| 91 | (¹) | 99.9 | 99.9 (3%) | 99.8 | 99.8 (3%) |
| 92 | 58 | 90.5 | 90.0 (3%) | 90.0 | 89.0 (3%) |
| 93 | 1 | 88 | 86 (5%) | 89 | 88 (5%) |
| 94 | 3 | 99 | 98 (5%) | 99 | 99 (5%) |
| 95 | 6 | 95 | 96 (5%) | 93 | 91 (5%) |
| 96 | 12 | 83 | 80 (5%) | 87 | 85 (5%) |
| 97 | 15 | 83 | 84 (5%) | 84 | 85 (5%) |
| 98 | 18 | 85 | 84 (5%) | 85 | 86 (5%) |
| 99 | 19 | 88 | 89 (5%) | 89 | 90 (5%) |
| 100 | 22 | 86 | 88 (5%) | 85 | 88 (5%) |
| 101 | 23 | 83 | 85 (5%) | 84 | 84 (5%) |
| 102 | 24 | 85 | 83 (5%) | 87 | 88 (5%) |
| 103 | 47 | 90.5 | 90.3 (3%) | 75.8 | 70.9 (3%) |
| 104 | 49 | 99.1 | 98.0 (3%) | 99.0 | 99.0 (3%) |
| 105 | 51 | 96.0 | 96.0 (3%) | 94.7 | 91.2 (3%) |
| 106 | 52 | 89.8 | 88.4 (3%) | 85.5 | 80.0 (3%) |

¹ Same as above but ratio 5:2:5.

We claim:

1. A composition containing 10–98 percent by weight of an acid addition salt between an unsubstituted aliphatic mono- or polycarboxylic acid having 8–44 carbon atoms and an amine of the formula

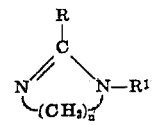

(A)

wherein R is hydrogen or an alkyl group of one to eight carbon atoms, R' is an unsubstituted aliphatic group of one to eight carbon atoms, or R and R' together form a methylene chain of 2–11 carbon atoms, n is an integer from 2 to 5, and 90–2 percent by weight of an extender selected from (a) a liquid or solid organic amine of the formula H₂NR", HNR"₂, NR"₃, R"NHR'"Φ^NH2 or morpholine wherein each R" represents an alkyl group of 1–18 carbon atoms, a hydroxy alkyl of two to three carbon atoms or cyclohexyl and R'" is an alkylene chain of two to six carbon atoms, (b) a higher aliphatic acid addition salt of an organic amine of the formula H₂NR", HNR"₂, NR"₃, R"NHR'"NH2 or morpholine, (c) a polyhydric alcohol partially esterified with a fatty acid, (d) a salt between the amine of formula (A) and an aromatic or hydroxy-substituted aromatic carboxylic acid, or any combination of these extenders.

2. The composition of claim 1 wherein R and R' in said amine together form a methylene chain of 2–11 carbon atoms.

3. The composition of claim 1 wherein R and R' of said amine of formula (A) together form a methylene chain of three to five carbon atoms, n is 3 or 4, and said aliphatic carboxylic acid is a monocarboxylic acid of 11–18 carbon atoms or a tricarboxylic acid of 35–44 carbon atoms.

4. The composition of claim 1 containing between 30 and 70 percent by weight of a higher aliphatic acid addition salt of an amine of formula (A) and between 70 and 30 percent by weight of any of said extenders.

5. The composition of claim 1 wherein said liquid or solid extender (a) is an amine of formula N₂HR", HNR"₂ or NR"₃ wherein each R" is selected from the group consisting of an alkyl chain of 1–18 carbon atoms, a hydroxyalkyl of two to three carbon atoms and cyclohexyl.

6. The composition of claim 1 wherein R and R' of said amine of formula (A) together form a methylene chain of three to five carbon atoms, n is 3 or 4, and said aliphatic carboxylic acid is a monocarboxylic acid of 11–18 carbon atoms or a tricarboxylic acid of 35–44 carbon atoms.

7. The composition of claim 1 wherein said polyhydric alcohol is a sorbitan ester.

8. The composition of claim 1 wherein said aromatic carboxylic acid is a monocyclic monocarboxylic acid.

* * * * *

UNITED STATES PATENT OFFICE
CERTIFICATE OF CORRECTION

Patent No. 3,625,859            Dated December 7, 1971

Inventor(s) Sei Hashimoto and Kunihiko Hirose

It is certified that error appears in the above-identified patent and that said Letters Patent are hereby corrected as shown below:

In Column 2, line 16, please delete "acids of 11 - carbon atoms and tricarboxylic acid of 35-44" and substitute therefor: "acids of 11-18 carbon atoms and tricarboxylic acid of 35-44"

In Column 2, lines 26 and 27, please delete "1,4-diaza-bicyclo(3,3,0)octene-octent-4, 1,8-diaza-bicyclo(5,4,0)-undecene-7, 1,8-diaza-bicyclo(7,4,0)-" and substitute therefor: "1,4-diaza-bicyclo(3,3,0)octene-4, 1,8-diaza-bicyclo(5,4,0)undecene-8, 1,8-diaza-bicyclo(7,4,0)-"

In Column 2, line 64, please delete "e.g., 18" and substitute therefor: "11 - 18"

In Column 6, Test 76, line 42, please delete "1,8-", please delete lines 43 and 44

In Claim 1, line 19, please delete "å"

Signed and sealed this 18th day of December 1973.

(SEAL)
Attest:

EDWARD M. FLETCHER, JR.　　　　　RENE D. TEGTMEYER
Attesting Officer　　　　　　　　Acting Commissioner of Patents